(12) United States Patent
Brocklehurst et al.

(10) Patent No.: US 8,210,818 B2
(45) Date of Patent: Jul. 3, 2012

(54) HELICOPTER ANTITORQUE TAIL ROTOR BLADE

(75) Inventors: Alan Brocklehurst, Dorset (GB);
Alessandro Scandroglio, Oleggio (IT)

(73) Assignee: Agusta S.p.A., Samarate (IT)

( * ) Notice: Subject to any disclaimer, the term of this patent is extended or adjusted under 35 U.S.C. 154(b) by 540 days.

(21) Appl. No.: 12/469,229

(22) Filed: May 20, 2009

(65) Prior Publication Data

US 2010/0092299 A1   Apr. 15, 2010

(30) Foreign Application Priority Data

May 22, 2008  (EP) .................................... 08425367

(51) Int. Cl.
*F01D 5/18* (2006.01)

(52) U.S. Cl. .................... 416/216; 416/209; 416/223 R; 416/238; 416/248

(58) Field of Classification Search .................. 416/145, 416/223 A, 223 R, 224, 228, 231 B, 235–238, 416/242, 400
See application file for complete search history.

(56) References Cited

U.S. PATENT DOCUMENTS

| | | | |
|---|---|---|---|
| 3,822,105 A | 7/1974 | Jepson | |
| 4,451,206 A | 5/1984 | Philippe et al. | |
| 4,927,331 A * | 5/1990 | Vuillet | 416/238 |
| 5,137,427 A | 8/1992 | Shenoy | |
| 5,332,362 A * | 7/1994 | Toulmay et al. | 416/223 R |
| 5,725,354 A * | 3/1998 | Wadia et al. | 416/224 |
| 6,168,383 B1 * | 1/2001 | Shimizu | 416/228 |
| 6,190,132 B1 * | 2/2001 | Yamakawa et al. | 416/228 |
| 6,196,066 B1 * | 3/2001 | Barbier | 73/456 |
| 6,231,308 B1 * | 5/2001 | Kondo et al. | 416/228 |
| 6,666,654 B2 * | 12/2003 | Olhofer et al. | 416/228 |
| 6,932,569 B2 * | 8/2005 | Torok et al. | 416/1 |
| 7,118,343 B2 * | 10/2006 | Loftus et al. | 416/145 |
| 7,252,479 B2 * | 8/2007 | Bagai et al. | 416/223 R |
| 7,281,900 B2 * | 10/2007 | Zientek | 416/231 B |
| 7,344,360 B2 * | 3/2008 | Wetzel | 416/238 |
| 7,513,750 B2 * | 4/2009 | Moffitt et al. | 416/228 |
| 7,690,895 B2 * | 4/2010 | Moroz | 416/132 B |
| 7,845,911 B2 * | 12/2010 | Karem | 416/237 |
| 7,854,593 B2 * | 12/2010 | Owen | 416/223 R |
| 8,029,241 B2 * | 10/2011 | McGrath et al. | 416/228 |
| 8,066,490 B2 * | 11/2011 | Babu et al. | 416/209 |
| 8,100,661 B2 * | 1/2012 | Enevoldsen et al. | 416/228 |

FOREIGN PATENT DOCUMENTS

| | | |
|---|---|---|
| EP | 0493303 | 7/1992 |
| EP | 1035014 | 9/2000 |

* cited by examiner

*Primary Examiner* — Michael Lebentritt
(74) *Attorney, Agent, or Firm* — Fish & Richardson P.C.

(57) ABSTRACT

A blade for an antitorque tail rotor of a helicopter, having a leading edge and a trailing edge opposite each other and elongated along a longitudinal axis of the blade; the trailing edge, in use, interacts with the air current after the leading edge; the blade also has an end portion extending between a reference section and a radially outer end of the blade with respect to a rotation axis of the blade; the rotation axis is outside the blade and crosswise with respect to the longitudinal axis; the length of the chord at the end portion decreases from the reference section to the radially outer end; and the leading and trailing edges are joined at the radially outer end.

4 Claims, 8 Drawing Sheets

HELICOPTER ANTITORQUE TAIL ROTOR BLADE

CROSS REFERENCE TO RELATED APPLICATIONS

This application claims priority under 35 U.S.C. §119 to European Patent Application No. 08425367.3 filed May 22, 2008. The entirety of the application is incorporated herein by reference.

BACKGROUND OF THE INVENTION

Helicopters are known comprising a fuselage; a main rotor fitted to the top of a centre portion of the fuselage; and an antitorque tail rotor for opposing the torque generated by the main rotor on the fuselage.

Tail rotors substantially comprise a drive shaft; a hub fitted to the drive shaft; and a number of blades fixed to and projecting radially from the hub.

More specifically, each blade extends lengthwise substantially radially, and is rotated by the hub in a plane perpendicular to the drive shaft axis.

Each blade is also movable in any plane with respect to the hub to manoeuvre the helicopter.

A need is felt within the industry to improve the design of the free end of the blade, at the opposite end to the hub, so as to improve the aerodynamic efficiency of the blade, reduce acoustic emissions of the antitorque tail rotor, and reduce the loads on the antitorque tail rotor control mechanisms.

SUMMARY OF THE INVENTION

It is an object of the present invention to provide a helicopter antitorque tail rotor blade designed to achieve the above in a straightforward, low-cost manner.

According to the present invention, there is provided a helicopter antitorque tail rotor blade, as claimed in the attached claims.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 14:
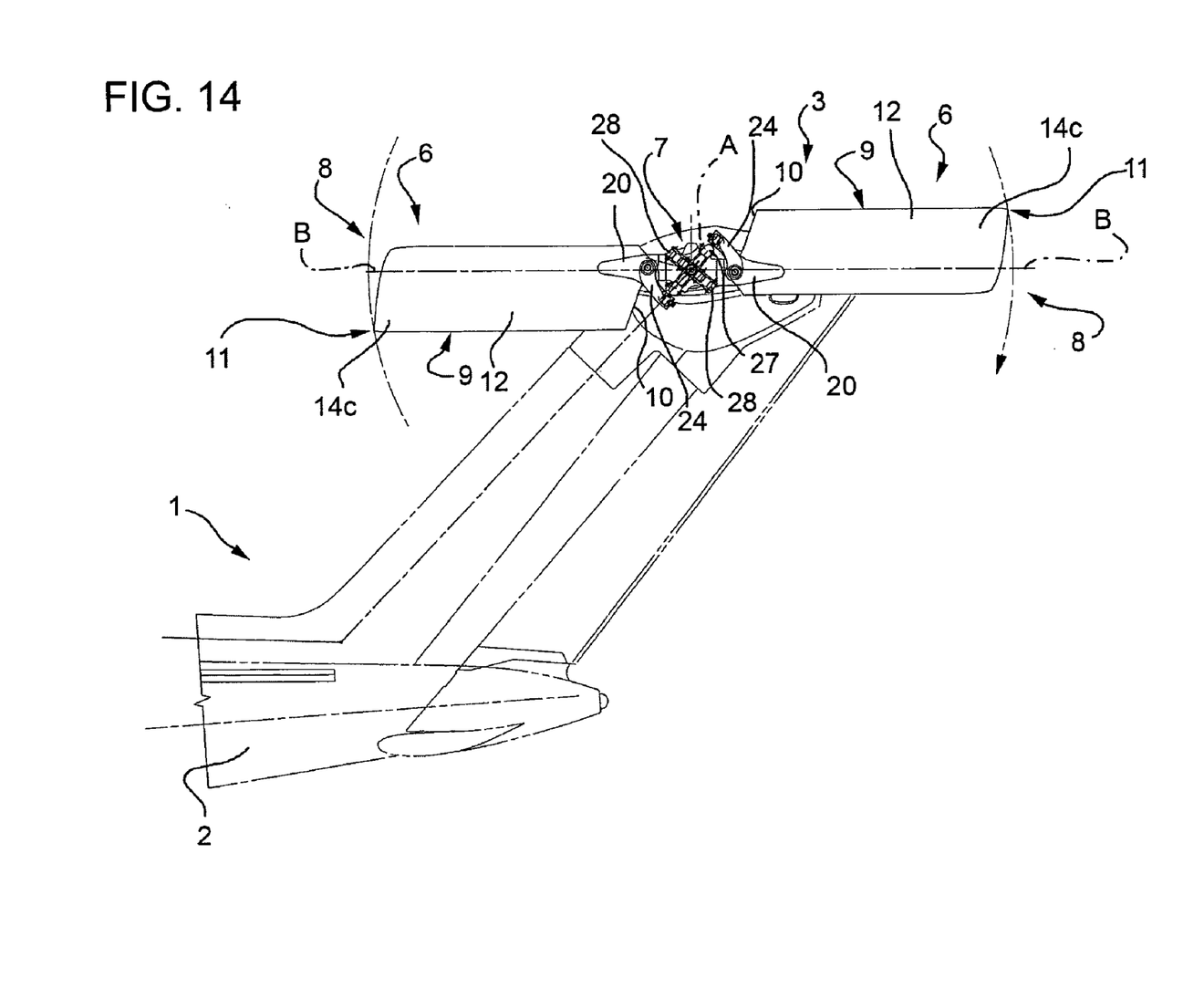
FIG. 14 shows a side view, with parts removed for clarity, of a tail portion of a helicopter comprising an antitorque rotor featuring a number of blades as illustrated in FIGS. 1-4.
Figure 17:
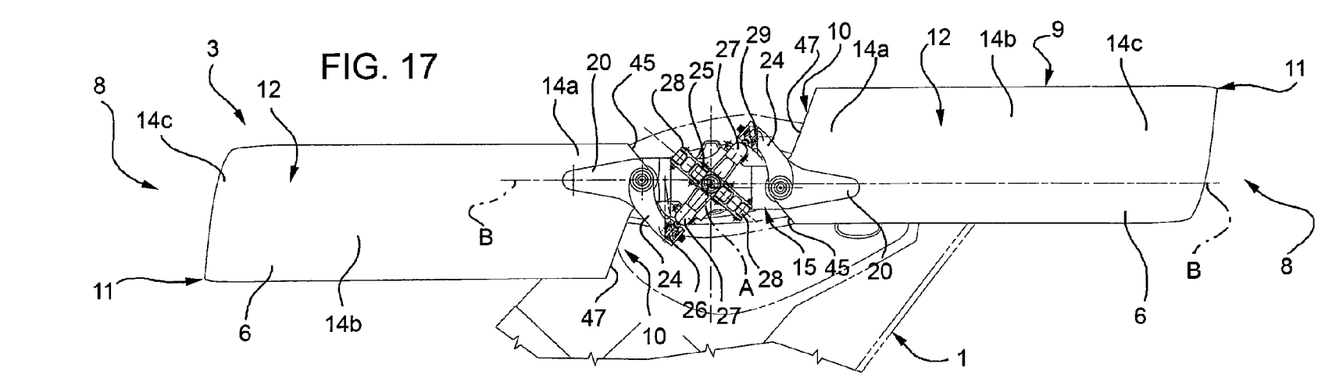
FIGS. 17 and 18 show side and top plan views respectively of the FIG. 14-16 tail rotor.
Figure 18:
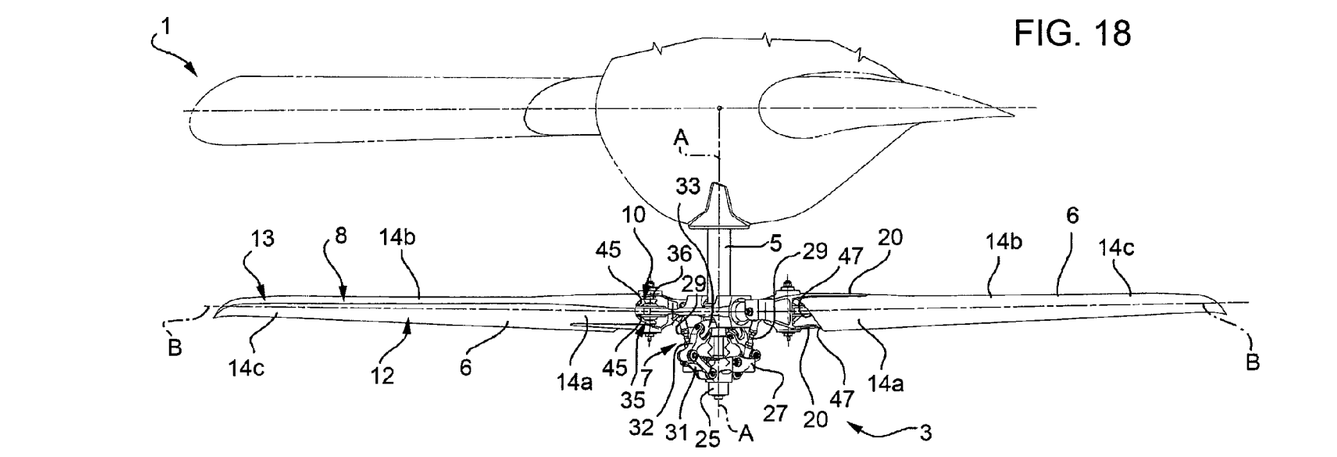

FIGS. 14, 17 and 18 show a tail portion of a helicopter 1 substantially comprising a fuselage 2; a main rotor (not shown) fitted to the top of fuselage 2 and rotating about a respective axis; and an antitorque tail rotor 3 projecting from a tail fin of fuselage 2 to oppose the torque transmitted by rotor 3 to fuselage 2.

More specifically, rotor 3 substantially comprises (FIGS. 15 to 18):

a drive shaft 5 rotating about an axis A crosswise to the rotation axis of the main rotor;

a number of—in the example shown, two—blades 6 extending along respective axes B substantially radial with respect to axis A; and a hub 7 connected functionally to shaft 5, and from which blades 6 project.

More specifically, hub 7 rotates blades 6 about axis A, allows blades 6 to move freely with respect to shaft 5 in a plane defined by axis A and respective axes B, and allows rotation of blades 6, by an external control, about respective axes B to adjust the respective angles of attack with respect to the air current.

Hub 7 substantially comprises (FIGS. 15 to 18):

a plate 15, which is rotated by shaft 5 about axis A, rotates with respect to shaft 5 about an axis C perpendicular to axis A and axes B, and is connected to blades 6 in angularly fixed manner with respect to axis A, and in rotary manner with respect to relative axes B;

two pairs of plates 20 connected in fixed manner to relative blades 6; and a sleeve 25, which is rotated by shaft 5 about axis A, is slid along axis A with respect to shaft 5 by a control not shown, and is connected to the two pairs of plates 20 to rotate blades 6 about respective axes B.

Figure 15:
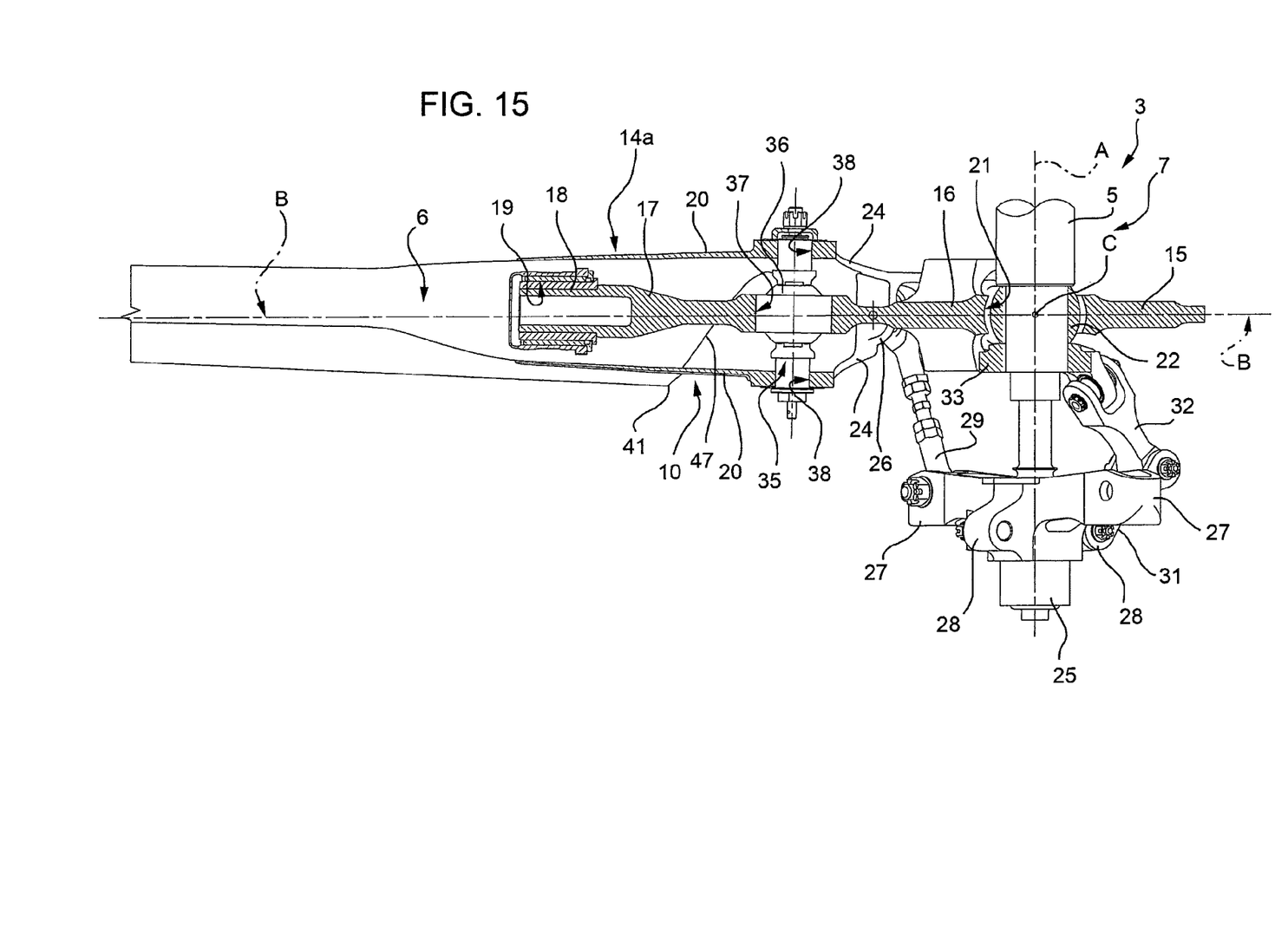
FIGS. 15 and 16 show sections, with parts removed for clarity, of the FIG. 14 tail rotor.

More specifically, plate 15 lies in a plane crosswise to axis A, and comprises a main portion 16 fitted to shaft 5; and two appendixes 17 having respective ends 18 opposite axis A and fitted inside respective seats 19 of respective blades 6 (FIG. 15).

Shaft 5 (FIGS. 15 and 16) is surrounded by a cylindrical member 22 engaging a seat 21 defined by main portion 16. Member 22 and seat 21 are connected in rotary manner about axis C and in angularly fixed manner about axis A.

Figure 16:
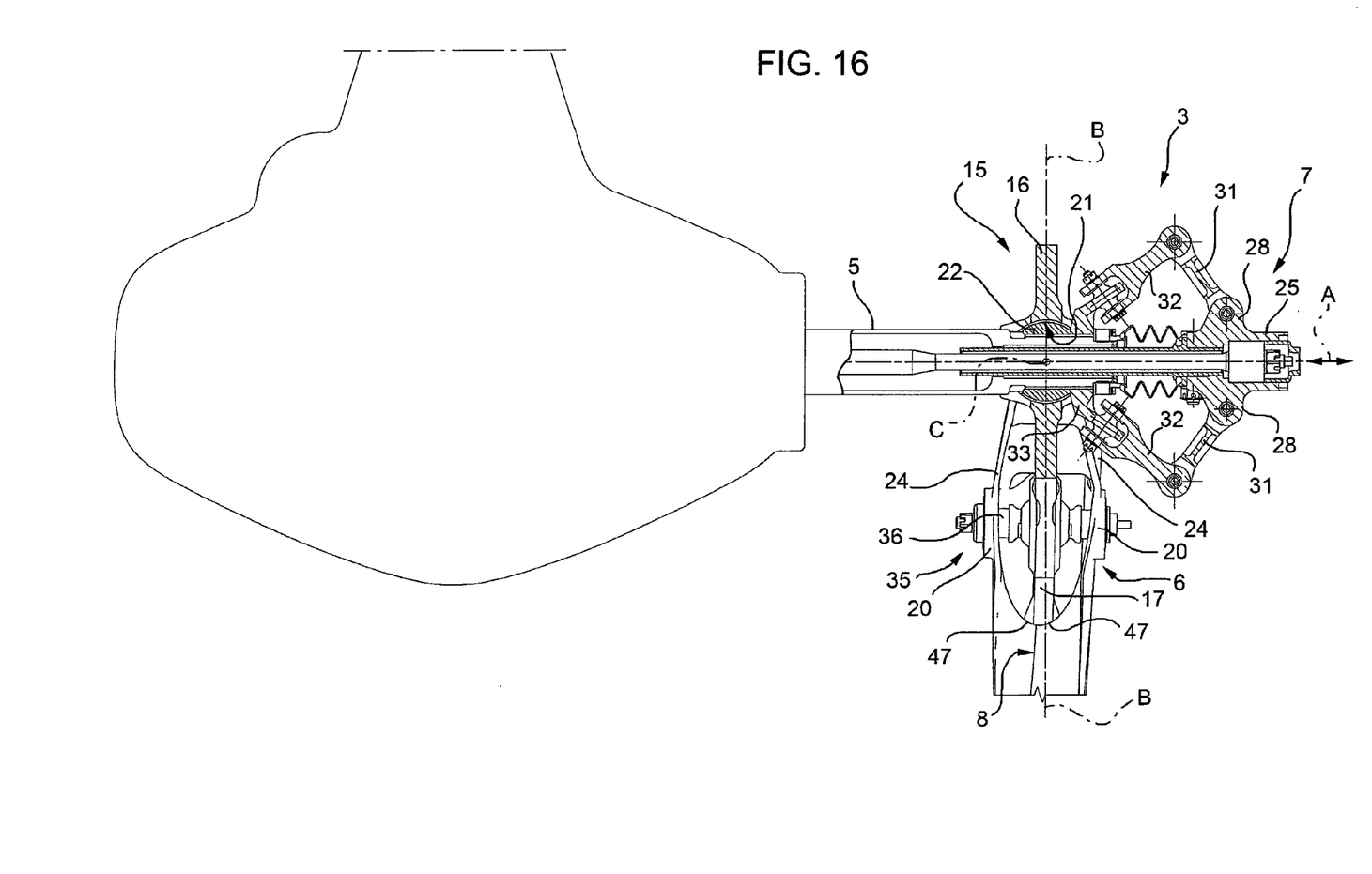

The surfaces of member 22 and seat 21 are conjugate, and have respective coincident centres located at the intersection of axes A and C.

Seat 21 and member 22 thus define a hinge, of axis C, allowing blades 6 to oscillate integrally with each other, i.e. flap, about axis C and with respect to shaft 5. More specifically, such oscillation is caused by the different aerodynamic loads on blades 6, as a result of the different relative speeds of blades 6 with respect to the air current.

Appendixes 17 project from main portion 16 on opposite sides of axis A, and extend inside respective blades 6; ends 18 are in the form of hollow cylinders coaxial with respective axes B; and seats 19 are in the form of cylindrical cavities extending along respective axes B, so that insertion of ends 18 inside respective seats 19 allows blades 6 to rotate about respective axes B with respect to plate 15, and makes blades 6 and plate 15 angularly fixed about axes A and C.

Plates 20 in each pair are fixed one to the face 12 and the other to the back 13 of a relative blade 6 (FIGS. 17, 18), are parallel to each other, and lie in respective substantially parallel planes.

Hub 7 comprises, for each pair of plates 20, a pair of arms 24 (FIGS. 14 to 17) having first ends fixed to respective plates 20 in the same pair of plates 20. The second ends of arms 24 in each pair are connected to each other by a transverse member 26 interposed between axis A and a radially inner end 10 of relative blade 6.

Sleeve 25 projects from shaft 5 on the opposite side of the tail fin, and comprises:

first radial appendixes 27 (FIGS. 14, 15, 17, 18) diametrically opposite with respect to axis A and connected to respective members 26 by respective ties 29; and second radial appendixes 28 (FIGS. 14 to 17) diametrically opposite with respect to axis A, and each connected by two levers 31, 32 to a plate 33 angularly integral with shaft 5 and interposed, along axis A, between shaft 5 and sleeve 25.

More specifically, each appendix 27 is interposed angularly between appendixes 28.

Ties 29 extend crosswise to axis A, and have first ends connected to relative appendixes 27; and second ends, opposite the first ends, connected to respective members 26 eccentrically with respect to relative axes B (FIG. 15).

More specifically, ties 29 are connected to respective members 26 so that, when sleeve 25 slides along axis A, blades 6 rotate in the same direction about respective axes B.

Each lever 31 has a first end hinged to sleeve 25; and a second end, opposite the first end, hinged to a first end of a corresponding lever 32.

Each lever 32 has a second end, opposite the first end, hinged to plate 33.

Plates 20 in each pair are connected to each other by a pin 35 perpendicular to axis B of relative blade 6, and which has an intermediate portion 36 housed inside a root portion 14a of relative blade 6, and engaging a seat 37, defined by relative appendix 17, in rotary manner with respect to axis B (FIG. 15).

More specifically, intermediate portion 36 has a spherical outer surface mating with a spherical surface defined by seat 37. More specifically, the spherical surfaces defined by intermediate portion 36 and relative seat 37 are concentric, and have respective centres along relative axis B.

Intermediate portions 36 of pins 35 and relative seats 37 thus define respective hinges allowing blades 6 to rotate about respective axes B with respect to plate 15.

Each blade 6 (FIGS. 1 to 4) is hollow, and comprises:

a leading edge 8 defined by the foremost points of blade 6 with reference to the rotation direction (shown in FIG. 14) of blade 6;

a trailing edge 9 defined by the rearmost points of blade 6 with respect to said rotation direction, located on the opposite side to leading edge 8, and which interacts with the air current after leading edge 8;

an end 11 opposite end 10 and radially outwards with respect to axis A; and face 12 and back 13, which are opposite, extend between ends 10 and 11, and are separated by leading edge 8 and trailing edge 9.

From end 10 to end 11, blade 6 comprises (FIGS. 1 to 8):

root portion 14a extending between end 10 and a section 50 perpendicular to trailing edge 9, and connected to plates 20;

an intermediate portion 14b extending between section 50 and a section 51 also perpendicular to trailing edge 9; and an end portion 14c extending between section 51 and end 11, and curving away from the tail fin of helicopter 1 with respect to root portion 14a and intermediate portion 14b.

In other words, end portion 14c has an anhedral with respect to the rest of blade 6.

More specifically, the extension of end portion 14c, i.e. the radial distance between section 51 and end 11, ranges between 8 and 16% of the overall radial extension of blade 6, i.e. the maximum distance between ends 10 and 11.

More specifically, from end 10 to end 11, leading edge 8 comprises a first portion 52 defined by two sloping segments and extending along root portion 14a; a straight second portion 53 extending along intermediate portion 14b and sloping with respect to the segments of first portion 52; and a curved third portion 54 extending along end portion 14c and curving away from the tail fin of helicopter 1.

More specifically, the first and second portion 52, 53 lie in a plane parallel to trailing edge 9, whereas the curve defining third portion 54 slopes with respect to trailing edge 9, which is straight.

Back 13 is interposed between face 12 and the tail fin from which rotor 3 projects.

Face 12 and back 13 of each blade 6 have respective holes 38 (FIGS. 1 to 3) adjacent to end 10 and fitted through with opposite ends of relative pin 35.

FIGS. 5 to 9 show respective sections of blade 6 in successive planes perpendicular to leading edge 8, and proceeding from end 10 to end 11.

As shown in the FIGS. 5 to 8 sections, blade 6 has respective profiles G asymmetrical with respect to relative chords P.

Figure 1:
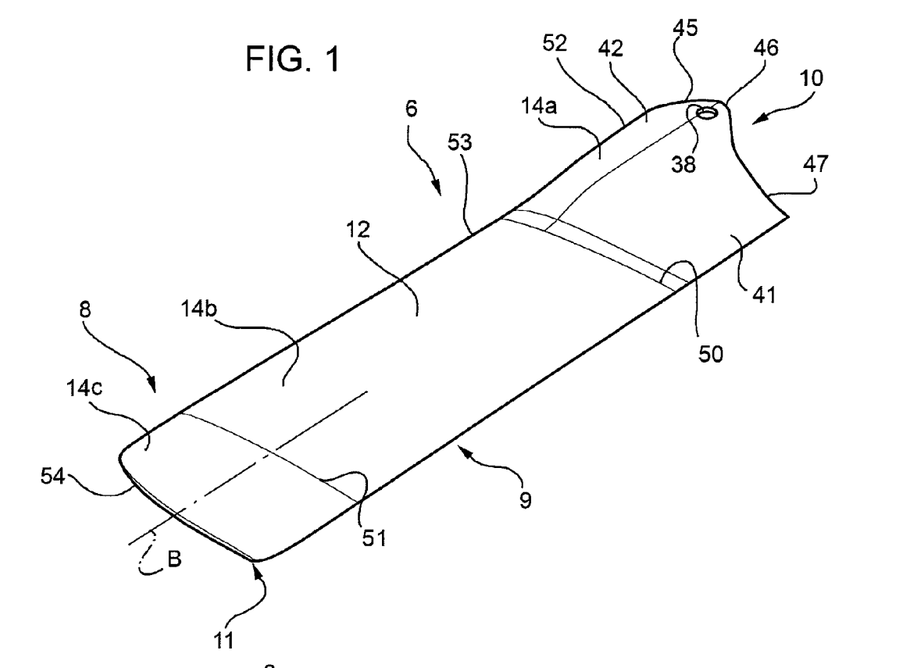
FIGS. 1 and 2 show views in perspective, from different angles, of a helicopter antitorque tail rotor blade in accordance with the present invention.
Figure 2:
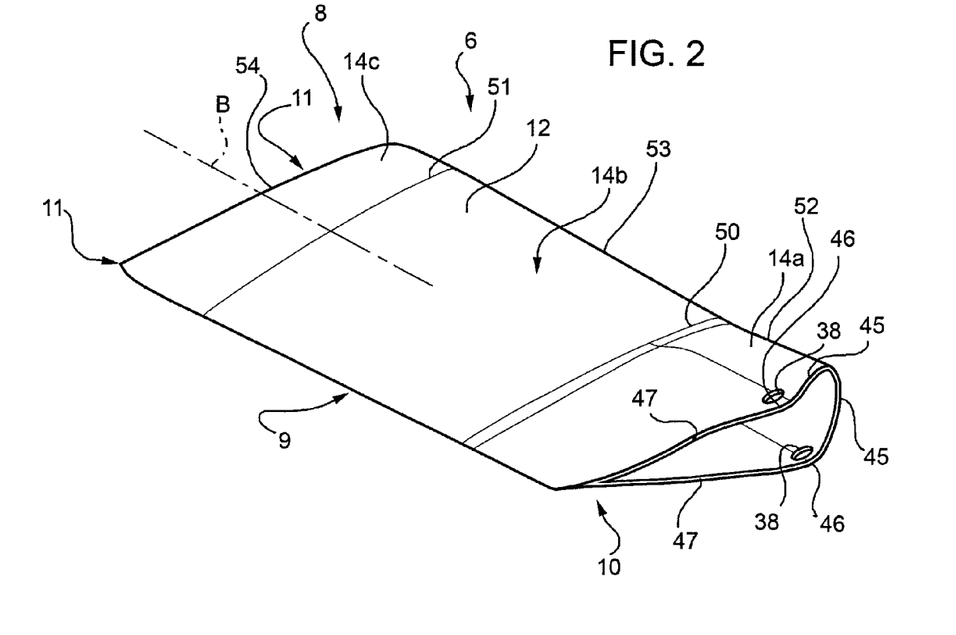
Figure 3:
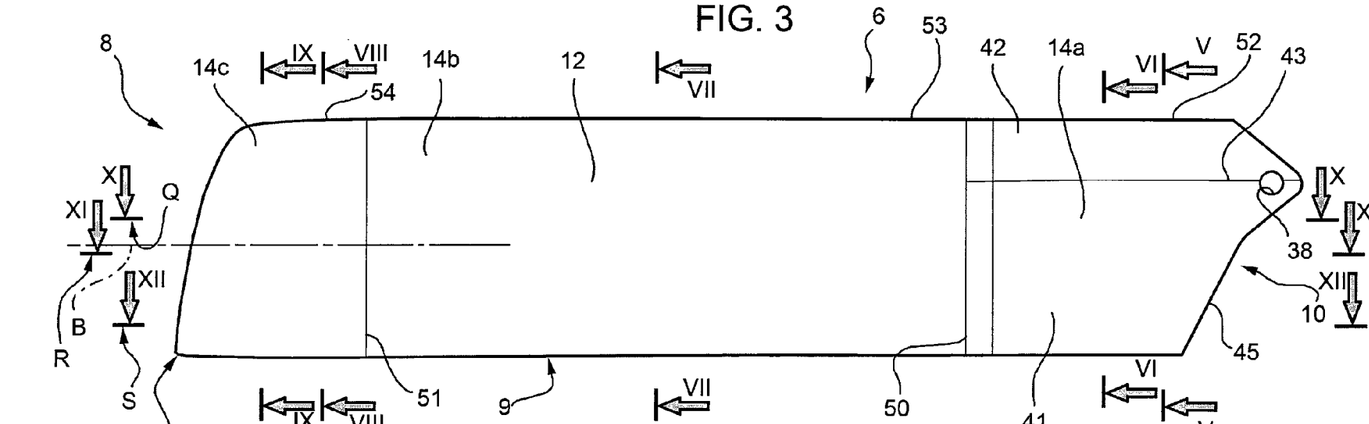
FIG. 3 shows a plan view of the FIGS. 1 and 2 blade.
Figure 4:
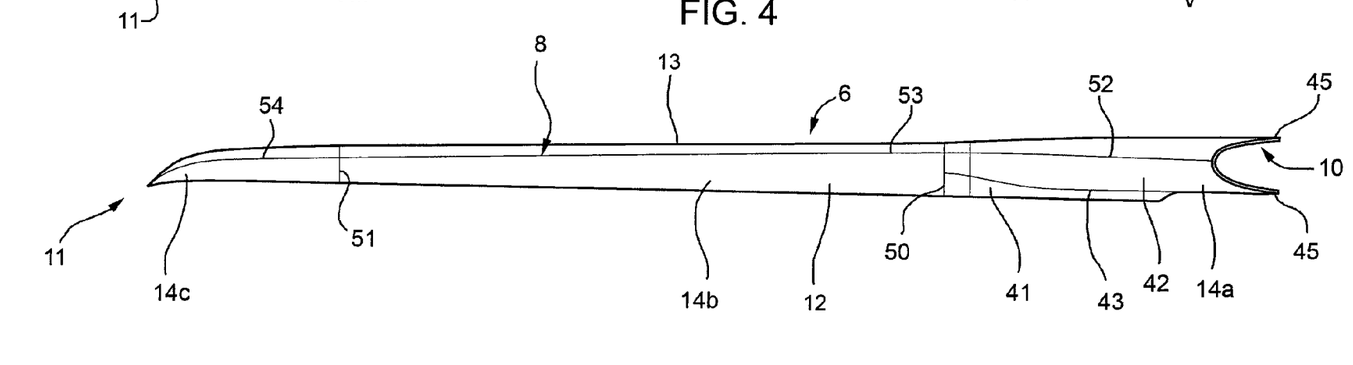
FIG. 4 shows a front view of a leading edge of the FIG. 1 blade.

It is important to note that "chord P" is intended here to mean the distance between leading edge 8 and trailing edge 9, measured in a plane perpendicular to trailing edge 9 and vertical (not shown) in FIG. 3.

More specifically, face 12 and back 13 are blended at leading edge 8, and are joined by a sharp edge at trailing edge 9, along both root portion 14a and intermediate and end portions 14b, 14c.

In each section perpendicular to leading edge 8 and trailing edge 9, the points of profile G defining back 13 are further away from chord P than the corresponding points of profile G defining face 12.

Figure 5:
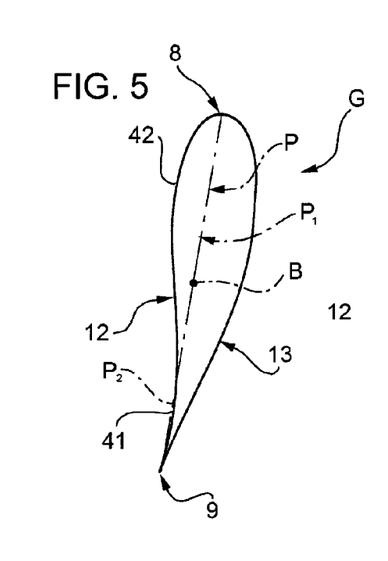
FIGS. 5 to 12 show sections in respective planes V-V, VI-VI, VII-VII, VIII-VIII, IX-IX, X-X, XI-XI, XII-XII in FIG. 3.
Figure 6:
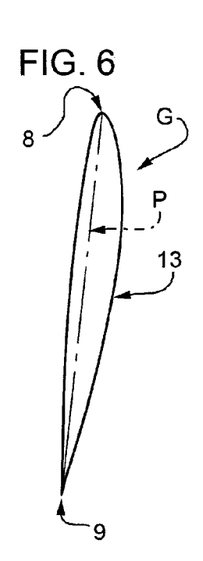
Figure 7:
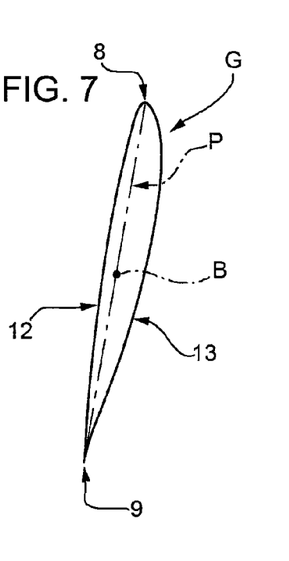

Back 13 is convex at root portion 14a and intermediate portion 14b (FIGS. 5, 6, 7).

At root portion 14a and adjacent to end 10, face 12 has a concave first portion 41 adjacent to trailing edge 9; and a convex second portion 42 interposed between portion 41 and leading edge 8 (FIG. 5).

With reference to the profile G at root portion 14a and adjacent to end 10 (FIG. 5), chord P comprises a main portion $P_1$ interposed between face 12 and back 13; and an end portion $P_2$ at the trailing edge 9 end. More specifically, adjacent to trailing edge 9, portion 41 is interposed between end portion $P_2$ and back 13 (FIG. 5).

Face 12 is convex at intermediate portion 14b.

Figure 8:
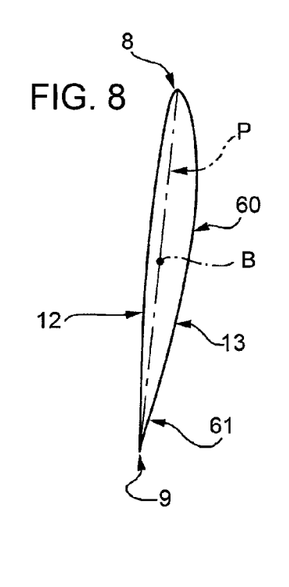
Figure 9:
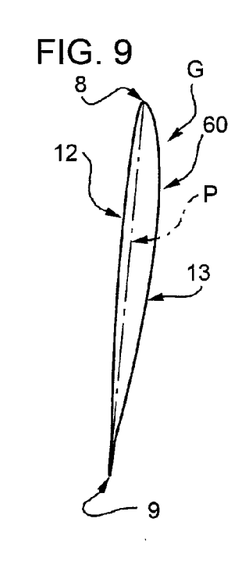

As shown in FIGS. 8 and 9, at end portion 14c, face 12 is convex, whereas back 13 comprises a convex portion 60 adjacent to leading edge 8, and a flat portion 61 adjacent to trailing edge 9.

Face 12 becomes gradually less convex along intermediate portion 14b and end portion 14c towards end 11. In other words, face 12 in each profile G tends to get closer and closer to relative chord P as it proceeds towards end 11.

As shown in FIGS. 5 to 9, the slope of chords P with respect to a fixed axis perpendicular to leading edge 8 and trailing edge 9 varies from end 10 to end 11. More specifically, the fixed axis (not shown) is vertical with reference to FIGS. 5 to 7, and the angle between chords P and the fixed axis decreases from root portion 14a (FIG. 5) to end portion 14c (FIG. 9). In other words, the setting angle of blades 6 varies along respective axes B, i.e. as opposed to lying in one plane, the locus of the points of chords P has a curved profile when viewed from above.

The length of chord P of blade 6 assumes a constant value $d_0$ at intermediate portion 14b.

The length d of chord P at end portion 14c advantageously decreases from section 51 towards end 11, and leading edge 8 and trailing edge 9 are joined at end 11.

More specifically, trailing edge 9 and third portion 54 of leading edge 8 are joined at end 11.

In other words, the length d of chord P decreases from value $d_0$ at section 51 to zero at end 11.

At end portion 14c, the length d of chord P varies as a function of the radial distance r from section 51, according to the equation $d=d_0(1-kr^n)$, where k and n are constant coefficients.

More specifically, coefficient n ranges from 2 to 11 and is preferably chosen equal to 6, whilst coefficient k equals ratio 1/R, where R is the radial distance between end 11 and section 51.

Coefficient k is preferably chosen so that the angle between trailing edge 9 and the plane tangent to leading edge 8 at end 11 ranges between 87 and 89 degrees. More specifically, coefficient k is chosen so that said angle ranges between 88 and 89 degrees.

Figures 12, 13:
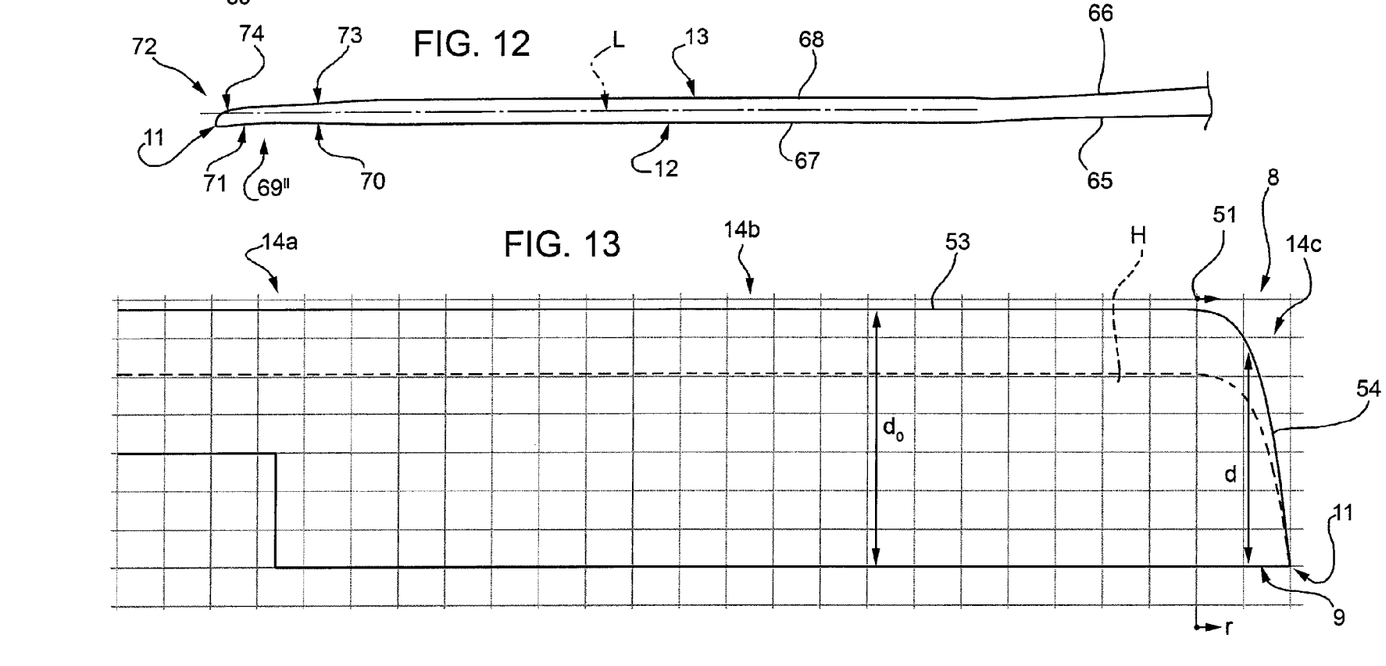
FIG. 13 shows the chord length pattern of the FIG. 1-4 blade lengthwise of the FIG. 1-4 blade.

FIG. 13 shows the length pattern of chords P and the locus of aerodynamic centres H along blade 6.

The term "aerodynamic centre" is intended to mean the point in each section of blade 6 in a plane perpendicular to trailing edge 9, with respect to which the aerodynamic moment coefficient remains constant alongside variations in the angle of attack of blade 6 with respect to the air current.

More specifically, the distance between the locus of points H and trailing edge 9 can be calculated, at end portion 14c, according to the equation: $0.75*d_0(1-kr^n)$.

The above distance can be measured along the y axis in FIG. 13.

Since end portion 14c curves with respect to intermediate portion 14b, the aerodynamic centres of end portion 14c also distance themselves from section 51 in a direction parallel to axis A.

The pattern of the above distance from section 51 can be calculated according to the equation: $h(1-kr^n)$, where h is a constant coefficient.

Figure 10:
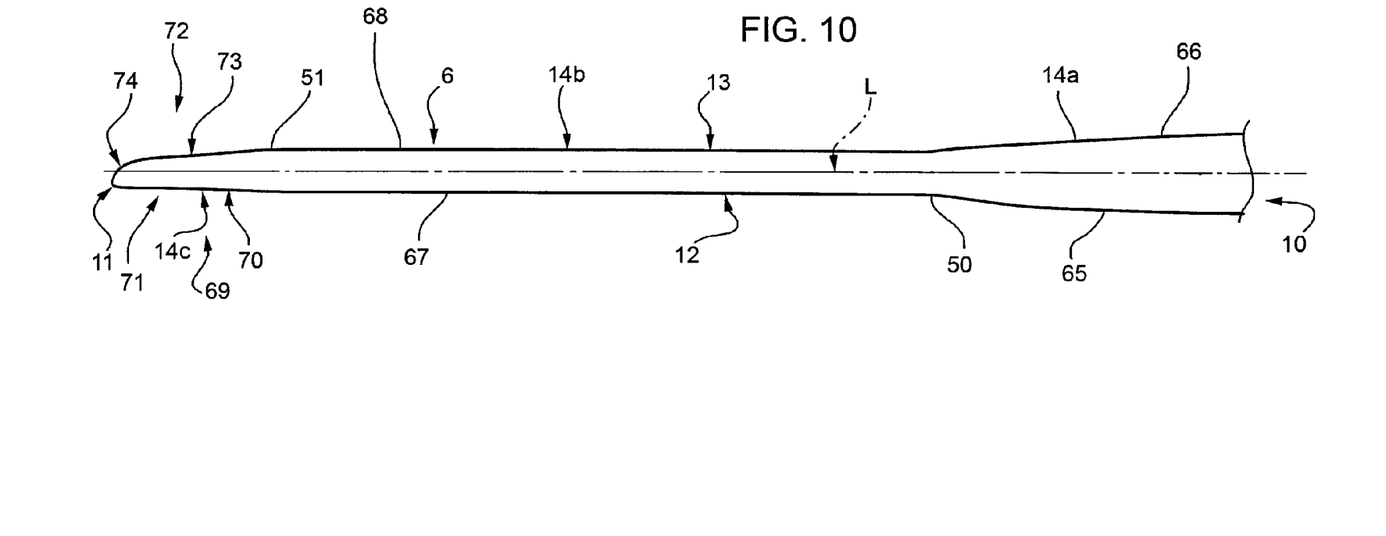

FIG. 10 shows a section of blade 6 in a longitudinal plane Q of blade 6 parallel to trailing edge 9 and crosswise with respect to axis A. In the section along plane Q, face 12 and back 13 are symmetrical with respect to a centreline L of blade 6 at root portion 14a and intermediate portion 14b.

More specifically, in plane Q, face 12 and back 13 have converging first portions 65, 66 at root portion 14a, and parallel second portions 67, 68 at intermediate portion 14b. At end portion 14c, face 12 and back 13 are asymmetrical with respect to centreline L, and have respective portions 69 72 converging at end 11 at end portion 14c.

More specifically, centreline L is equidistant from portions 65, 66 and 67, 68.

From section 51 to end 11, portion 69 comprises a straight portion 70 sloping with respect to portion 67 and towards centreline L; and a straight portion 71 parallel to centreline L.

From section 51 to end 11, portion 72 comprises a straight portion 73 sloping with respect to portion 68 and towards centreline L; and a curved portion 74 terminating at end 11 and intersected by centreline L.

Figure 11:
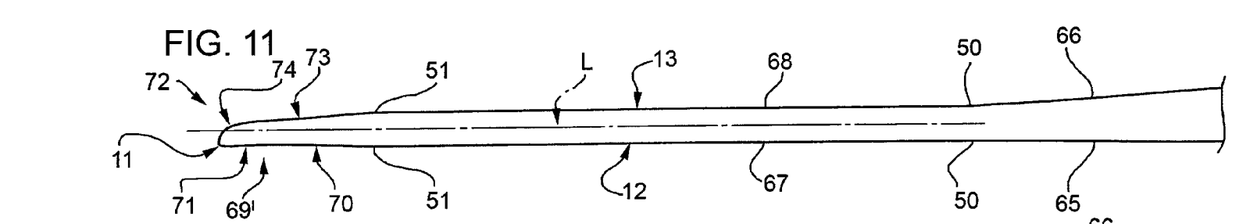

FIGS. 11 and 12 show sections of blade 6 in respective planes R, S parallel to plane Q and interposed between trailing edge 9 and plane Q.

The sections of blade 6 in planes R, S are similar to the section of blade 6 in plane Q, and are only described insofar as they differ from the latter, using the same reference numbers, wherever possible, for corresponding or equivalent parts.

More specifically, portions 69', 69" in the blade sections in respective planes R, S are concave.

Plane R is interposed between planes Q and S, and portion 69" in the section of blade 6 in plane S is more concave than portion 69' in the section of blade 6 in plane R.

In actual use, shaft 5 rotates about axis A to rotate hub 7.

Plate 15 rotates blades 6 about axis A, while the connection between member 22 and seat 21 in plate 15 allows blades 6 to oscillate freely about axis C under aerodynamic loads.

By means of an external control, blades 6 can be rotated by the same angle and in the same direction about respective axes B to vary the angles of attack of blades 6 with respect to the air current flowing over blades 6.

More specifically, the external control translates sleeve 25 along axis A, which translation is transmitted to ties 29 and members 26.

Ties 29 being connected to members 26 eccentrically with respect to relative axes B, translation of ties 29 rotates plates 20 and, therefore, blades 6 about respective axes B.

As the blades rotate, seats 19 of blades 6 rotate about respective axes B with respect to the corresponding ends 18 of relative appendixes 17 of plate 15, and pins 35 rotate about relative axes B with respect to seats 37 of relative appendixes 17.

As blades 6 rotate, the swirl produced by end portion 14c of each blade 6 also impacts to a lesser degree on the other blade 6.

The advantages of blade 6 according to the present invention will be clear from the above description.

In particular, the Applicant has observed that the pattern of length d of chord P at end portion 14c improves the efficiency and reduces the noise level of tail rotor 3.

More specifically, the efficiency of tail rotor 3 is particularly high in both hovering and high-speed flight conditions. In other words, the ratio between the thrust generated by rotor 3 on the tail fin and the torque applied to shaft 5 is particularly high and over 0.7.

The reason for this lies in the design of end portion 14c, which provides for more homogeneous, less turbulent air current flow over blade 6, and for reducing the extent to which swirl produced at end 11 of one blade 6 impacts the other blade 6, thus greatly reducing the extension of the shock wave on end portion 14c.

Finally, because face 12 and back 13 come together asymmetrically at end portion 14c, the above advantages can be achieved with no need for a marked anhedral end portion.

The above advantages can therefore be achieved by reducing the centrifugal force acting on end portion 14c and, therefore, the loads on the controls, with respect to the standard anhedral end portion design.

Clearly, changes may be made to blade 6 as described and illustrated herein without, however, departing from the protective scope defined in the accompanying Claims.

In particular, the means hinging hub 7 to shaft 5 and blades 6 to hub 7 may be of a different type.

The invention claimed is:

1. A blade for an antitorque tail rotor of a helicopter, comprising:
   a leading edge and a trailing edge opposite each other and elongated along a longitudinal axis of the blade; said trailing edge, in use, interacting with the air current after said leading edge, an intermediate portion of the blade extending between a further section, radially inner with respect to the reference section and the reference section it self, the chord of the blade assuming a constant value d0 at the intermediate portion, a first and a second surface opposite each other and extending between said leading edge and said trailing edge;

said first and second surface, when sectioned in a longitudinal plane of the blade parallel to said trailing edge and crosswise with respect to the rotation axis of the blade, respectively having a first and a second contour joined at said end;

said first and second contour respectively comprising a first and second portion extending along said intermediate portion, and a third and fourth portion extending along said end portion; said third and fourth portion being asymmetrical with respect to a centerline of said blade equidistant from said first and second portion, and an end portion extending between a reference section and a radially outer end of said blade with respect to a rotation axis of said blade($6$); said rotation axis($A$) being outside the blade and crosswise with respect to said longitudinal axis;

the length of the chord at said end portion decreasing from said reference section to said end and said leading and trailing edges being joined at said end;

wherein the length ($d$) of said chord equals a length d0 at said reference section, and decreases, from said reference section to said end, according to the equation $d=d0(1-kr^n)$, where r is the distance from said reference section, and k and n are constant coefficients; n ranging between 2 and 11 and k being equal to ratio $1/R$, where R is the radial distance between said end and said reference section.

2. A blade as claimed in claim 1, wherein said third portion comprises at least a straight portion terminating at said end; said fourth portion comprising at least a convex portion connected to said third portion at said end.

3. A blade as claimed in claim 1, wherein said second surface is interposed, in use, between said first surface and a tail fin of said helicopter.

4. A blade as claimed in claim 1, wherein said trailing edge is straight.

* * * * *